US008467597B2

(12) United States Patent
Monti et al.

(10) Patent No.: US 8,467,597 B2
(45) Date of Patent: Jun. 18, 2013

(54) FEATURE-BASED SEGMENTATION METHOD, FOR SEGMENTING A PLURALITY OF LOOSELY-ARRANGED DUPLICATE ARTICLES AND A GROUP FOR ACTUATING THE METHOD FOR SUPPLYING A PACKAGING MACHINE

(75) Inventors: Giuseppe Monti, Bolonga (IT); Andrea Prati, Modena (IT); Rita Cucchiara, Modena (IT); Paolo Piccinini, Modena (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 625 days.

(21) Appl. No.: 12/767,392

(22) Filed: Apr. 26, 2010

(65) Prior Publication Data

US 2010/0284608 A1     Nov. 11, 2010

(30) Foreign Application Priority Data

May 7, 2009     (IT) .............................. B02009A0278

(51) Int. Cl.
*G06K 9/36*     (2006.01)
*G06T 3/00*     (2006.01)

(52) U.S. Cl.
USPC ............................................ 382/153; 38/153

(58) Field of Classification Search
None
See application file for complete search history.

(56) References Cited

U.S. PATENT DOCUMENTS

| | | | | |
|---|---|---|---|---|
| 4,876,728 A | * | 10/1989 | Roth | 382/153 |
| 6,490,369 B1 | * | 12/2002 | Beiman | 382/153 |
| 7,136,505 B2 | * | 11/2006 | Wenzel et al. | 382/103 |
| 7,280,687 B2 | * | 10/2007 | Ban et al. | 382/154 |
| 7,474,939 B2 | * | 1/2009 | Oda et al. | 700/245 |
| 7,996,114 B2 | * | 8/2011 | Ban et al. | 700/259 |
| 8,315,739 B2 | * | 11/2012 | Dai | 700/259 |
| 2008/0253612 A1 | * | 10/2008 | Reyier et al. | 382/103 |
| 2009/0116728 A1 | * | 5/2009 | Agrawal et al. | 382/154 |

FOREIGN PATENT DOCUMENTS

EP     0951968 A2 * 10/1999

OTHER PUBLICATIONS

Stefan Zickler, et al.;"Detection and Localization of Multiple Objects" Humanoid Robots' International Conference on IEEE; Dec. 1, 2006; pp. 20-25.
Stockman G, et al, "Matching Images to Models for Registration and Object Detection via Clustering" IEEE Transactions on Pattern analysis and Machine Intelligence; May 1, 1982.

(Continued)

*Primary Examiner* — Brian P Werner
(74) *Attorney, Agent, or Firm* — William J. Sapone; Ware Fressola; Maguire & Barber LLP

(57) ABSTRACT

A segmentation method for segmenting a plurality of duplicate articles (3) involves acquiring an image (M) of a sample article (30); calculating keypoint-descriptors of the image (M); defining an identifying figure (Z); acquiring a first image (I1) of a plurality of duplicate articles; matching keypoint-descriptor pairs; acquiring a position and an orientation of the identifying figure (Z) with respect to a first keypoint-descriptor pair having a match with a second keypoint-descriptor pair; defining an identifying figure; applying the two preceding stages to a plurality of keypoint-descriptor pairs; collecting together identifying figures of projection having a predetermined degree of superposing; defining a representative figure formed by a minimum predetermined number of identifying figures of projection, which has a same shape and dimension as an identifying figure of projection, and is selected to estimate a position of a corresponding article illustrated in the first image of a plurality of duplicate articles.

18 Claims, 6 Drawing Sheets

OTHER PUBLICATIONS

Jakub Segen; "Locating Randomly Oriented Objects from Partial View";3rd Intl. Conf. On Robot Visions and Sensory Controls; Oct. 1983; pp. 676-684.

Todd Anthony Cass; "A Robust Parallel Implementation of 2D Model-Based Recognition"; Proceedings CVPR, Michigan, USA; 1988; p. 884.

Vittorio Ferrari, et al; "Simultaneous Object Recognition and Segmentation from single or Multiple Model Views"; Int. J. Comput. Visions, 2006, vol. 67 pp. 159-188.

Ying Liu, et al; "A Survey of content-Based Image Retrieval with high-level semantics". Pattern Recognition. 2007, vol. 40, pp. 262-282.

K.Rahardja, et al "Vision Based Bin Picking; Recognition and Localization of Multiple Complex Objects . . .", 1996 Intl Conf on Intelligent Robots & systems. 1448-1457.

J. Zhang, et al "Local Features and kernels for classification of Texture and Object Catagories. A Comprehensive Study". Intl Journal of Computer Vision Jun. 2007 pp. 213-238.

P. Felzenszwalb, et al; "A Discriminatively Trained Multi-Scale, Deformable part Model." Intl. Conf. on Computer Vision and Pattern Recognition, Jun. 2008 pp. 1-8.

David G. Lowe, Distinctive Image Features from Scale-Invariant Keypoints. Intl. Journal of Computer Vision, Nov. 2004, vol. 60 pp. 90-110.

B.Liebe, et al, "Robus Object Detection with Interleaved Categorization and Segmentation." Intl. Journal of Computer Vision. May 2008, vol. 77 pp. 259-289.

T.Knoll, et al, "Recognizing Partially Visiable Objects Using Feature Indexed Hypotheses." Journal of Robotics and Automation Mar. 1986, vol. 2, pp. 3-13.

Fukanaga Keinosuke, et al, "The Estimation of the Gradient of a Density Function, w/ Applications of Pattern Recognition." Transactions on Information Theory, Jan. 1975 p32-40.

Navneet Dalal, et al; Histograms of Oriented Gradients for Human Detection. Conf. on Computer Vision and Pattern Recognition, 2005, vol. 1, pp. 886-893.

Herbert Bay, et al; Proceedings of the 9th European Conference on computer Vision, 2006, vol. 3951, pp. 404-417.

* cited by examiner

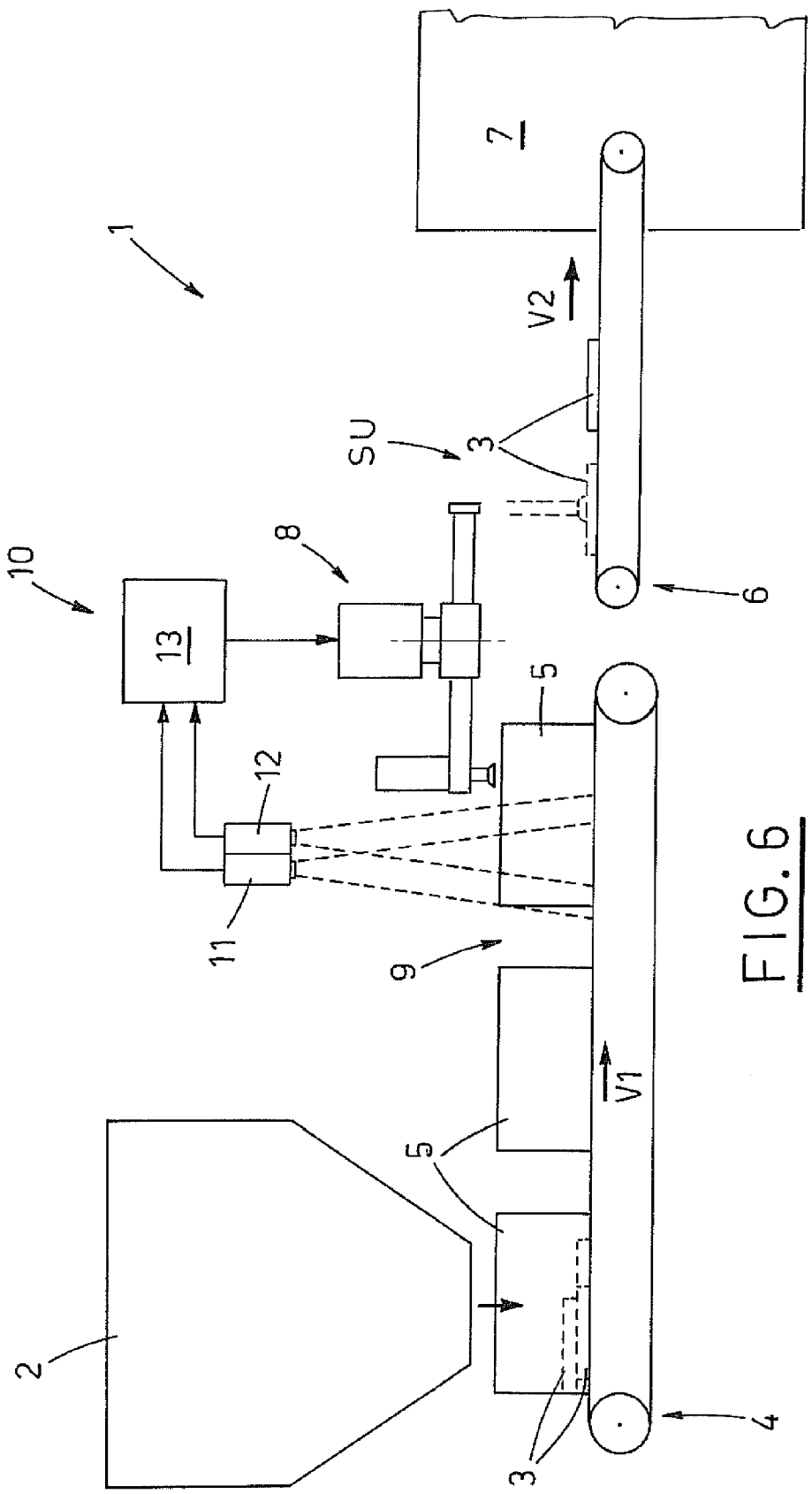

FEATURE-BASED SEGMENTATION METHOD, FOR SEGMENTING A PLURALITY OF LOOSELY-ARRANGED DUPLICATE ARTICLES AND A GROUP FOR ACTUATING THE METHOD FOR SUPPLYING A PACKAGING MACHINE

FIELD OF THE INVENTION

The present invention relates to a feature-based segmentation method for segmenting a plurality of loosely-arranged duplicate articles arranged for example in a storage zone where they are amassed in a random arrangement. The invention further relates to a method for picking up articles arranged loosely in a storage zone of articles and for positioning the articles in an outlet station and to a group for actuating the method. The invention also relates to use of the group for supplying an article packaging machine.

DESCRIPTION OF THE PRIOR ART

The detecting and segmenting of articles are crucial operations for various computer vision applications, such as recognition of an article [A] (See Bibliographical References), acquisition of an image or a video [B], automatic movement of a robot [C], or industrial applications of the pick-and-place type [D]. While for acquiring an image or a video the basic aim is to identify a single and better identification of the article or interest, in the case of pick-and-place applications, for example, it is not limited to counting and classification of the first or best identification, but also determines the arrangement, orientation and the dimensions of all (or almost all) the duplicates/identifications.

The duplicates of the articles can have different dimensions, positions and orientations, and can be seen from various points of view and under various illumination conditions. Thus, the segmentation thereof can become very problematic, especially when taking into account the possibility that some articles are only partially visible, for example, such as when they articles are amassed in a storage zone of articles in a random arrangement.

The segmentation of duplicate articles develops for example in three main stages.

The first stage is aimed at defining and calculating an appropriate measurement of similarity between the target article (or part thereof) and the duplicate articles in the current image: to this end, two different prior art solutions are known. The first method relates to the BoW, or Bags of Words model, which is based on the histogram of the local characteristics [E]. However, taking account of the fact that the BoW model is based on histograms, the main drawback consists in the lack of spatial information, which makes the method unreliable in disordered scenarios in which there are present duplicate articles arranged loosely. A second method, known as the Part Based Model, considers the spatial information of the local characteristics (such as the Star Model [F]).

The second stage exploits the measurement of similarity in order to locate the duplicates. For example, like co-variant regions provide a set of points which are invariant in scale, rotation and translation, thus being robust in the event of variations in illumination and variations of point of view. Local descriptors, such as SIFT (Scale Invariant Feature Transform) [G], are extracted such that a Generalized Hough Transform is applicable, or a probabilistic model [H] in order to locate the position of the articles. Also known is the use of local characteristics in order to locate articles [I], which due to the fact of using very specific characteristics (such as round holes) cannot be easily extended to any type of article.

The third stage originates in the localization of the article (for example the article's center of gravity) in order to segment the whole shape of the article in the most accurate manner possible and it has been rarely used in the prior art, as there is the need to obtain segmentation of the whole shape only for those applications in which the heft of the article has to be estimated.

SUMMARY OF THE INVENTION

The aim of the present invention consists in providing a segmentation method based on the characteristics for segmenting a plurality of duplicate articles of any type and complexity, arranged randomly such as to result even partially hidden.

A further aim of the present invention consists in providing a segmentation method based on the characteristics, implementation of which enables an adequate operation speed to be reached for industrial applications aimed at picking up articles from a storage zone thereof in which the articles are randomly ordered.

The above-cited aims are obtained by a segmentation method based on the characteristics for segmenting a plurality of duplicate articles arranged loosely, as set out in claim 1, which comprises stages of: acquiring an image of a sample article; calculating keypoints of the image of a sample article and corresponding descriptors in order to obtain a respective plurality of keypoint-descriptor pairs of the image of a sample article; defining an identifying figure on the image of a sample article in order to estimate a shape of the sample article illustrated in the image of a sample article; acquiring a first image of a plurality of duplicate articles; calculating the keypoints of the first image of the plurality of duplicate articles and the corresponding descriptors in order to obtain a respective plurality of keypoint-descriptor pairs of the first image of the plurality of duplicate articles; performing a matching of the keypoint-descriptor pairs of the image of a sample article with the keypoint-descriptor pairs of the first image of a plurality of duplicate articles in order to define similarity correspondences between keypoint-descriptor pairs of the image of a sample article and the keypoint-descriptor pairs of the first image of a plurality of duplicate articles; acquiring a relative position and a relative orientation of the identifying figure with respect to a first keypoint-descriptor pair of the image of a sample article having a match with a second keypoint-descriptor pair of the first image of a plurality of duplicate articles; defining, in the first image of a plurality of duplicate articles, an identifying figure of projection having a shape and dimension which are comparable or identical to those of the identifying figure, which identifying figure of projection has a relative position and a relative orientation with respect to the second keypoint-descriptor pair of the first image of a plurality of duplicate articles which are identical respectively to the relative position and to the relative orientation assumed by the identifying figure arranged in the image of a sample article with respect to the first keypoint-descriptor pair of the image of a sample article; applying the two preceding stages to a plurality of keypoint-descriptor pairs of the image of a sample article having a match with a keypoint-descriptor pair of the first image of a plurality of duplicate articles; collecting together identifying figures of projection having between them a predetermined degree of superposing; defining a representative figure for each group of identifying figures of projection which is formed by a minimum predetermined number of identifying figures of projection, which representative figure has a same shape and dimension as an identifying figure of projection, and is selected in order to estimate a position of a corresponding article illustrated in the first image of a plurality of duplicate article.

For each group of identifying figures of projection, the corresponding representative figure can take on an intermediate position with respect to the positions assumed by the identifying figures of projection of the considered group; for example, the position of the representative figure can be calculated as a mean of the positions taken on by the identifying figures of projection of the considered group. In general, however, there exists a relation of proximity between the representative figure thus defined and the identifying figures of projection of the considered group.

The representative figures thus defined constitute an estimation of the position and orientation of corresponding articles illustrated in the first image of a plurality of articles.

The characteristics of the method of claim 1, as set out above, advantageously satisfy the prefixed aims; the duplicate articles captured in the first image can be arranged in three-dimensional space in a totally random way, and can even be additionally partially superposed among themselves.

In general any identifying figure can be selected in order to estimate the shape of the sample article which is illustrated in the image of a sample article; a like identifying figure can be, for example, an irregular geometric figure, such as a figure having an outlined formed by a broken and/or curved line. This identifying figure preferably includes the sample article, and represents it in the sense that its area and outline are comparable to the area and outline of the sample article, respectively. The identifying figure can be the minimum rectangular box including the sample article itself; in broader terms, the identifying figure can be constituted by a polygon including the sample article; in an example, it is possible to select the smallest polygon including the sample article according to the number of sides and/or length of the sides. This is particularly advantageous as it enables an approximation of the outline of the sample article by means of a closed broken line.

In an aspect of the invention, each identifying figure of projection, associated to a corresponding identifying figure and a first keypoint-description pair of the image of a sample article having a match with a second keypoint-descriptor pair of the first image of a plurality of duplicate articles is obtained as a Euclidean transformation of the identifying figure; thus, the identifying figure and the projection thereof have the same shape and dimensions. In other words, with reference to any first keypoint-descriptor pair having a match with a second keypoint-descriptor, an appropriate roto-translation transformation of the identifying figure can be defined from the plane in which the sample article is contained in the plane in which the first image of the plurality of articles is contained.

In a further aspect of the invention, the image of a sample article and the first image of a plurality of duplicate articles are substantially taken from the same point of view, for example with the same image acquisition device (camera, video camera, etc.).

In a still further aspect of the invention, before the relative image is acquired the sample article is orientated in three-dimensional space in an orientation which is similar or comparable to the position assumed by a number of duplicate articles which are part of the plurality of duplicate articles captured in the first image of a plurality of duplicate articles.

By way of example, if the duplicate articles which are part of the plurality of duplicate articles are more probably arranged in a predetermined orientation (for example in a substantially horizontal orientation in a case in which the articles are more or less planar and arranged loosely in a storage container), then the sample article is orientated in three-dimensional space according to the predetermined orientation; therefore, the image of the sample article thus-orientated is acquired. In this way the method acquires a greater reliability and robustness, as will be noted by technical experts in the sector.

This is even truer if the image of the sample article and the first image of a plurality of duplicate articles are taken substantially from a same point of view and if the identifying figures of projection are obtained as Euclidean transformations of the identifying figure.

In a further aspect of the invention (to be considered additionally or separately with respect to the other above-introduced aspects), it is possible to acquire a plurality of images of the same sample article, each image being distinguished from another by the fact that the sample article is rotated in three-dimensional space by a predetermined angle with respect to a perpendicular direction to the common plane in which the plurality of images has been captured, with the additional condition that the successive stages of the method are repeated for each image of the plurality of images of the sample article. In other words and in an example, the method comprises acquiring a first image of the sample article, calculating the keypoints of the first image and the relative descriptors, defining an identifying figure on the first image (first three steps a), b), c) of the method), acquiring a second image, calculating the keypoints of the second image and the relative descriptors, defining an identifying figure on the second image (first three steps a), b), c) of the method), and so on for all the preselected images of the same sample article. There follows an application of the following steps of the method (acquiring a first image of a plurality of duplicate articles, etc.), taking into account all the keypoint-descriptor points of each image of the sample article thus obtained, which will be used to establish if there exist any matches with the keypoint-descriptor pairs of the first image of a plurality of articles.

In this way, for each first keypoint-descriptor pair of one of the images of the sample article having a match with a second keypoint-descriptor pair of the first image of the plurality of duplicate articles, a same identifying figure and a correspondingly equal identifying figure of projection is always definable; advantageously, the overall number of keypoint-descriptor pairs of the first image of a plurality of articles having a match with a keypoint-descriptor pair of one of the images of the sample article also increases, as does the number of identifying figures of projection definable in the first image of a plurality of duplicate articles, which makes the present segmentation method more reliable and robust.

In a still further aspect of the invention, the identifying figure is identified by a plurality of characteristic points which represent it (and thus replace it), which for example can be the vertices of the minimum rectangular or polygonal box including the sample article, as represented in the image of the sample article. The steps of the method can thus be adapted such that:

the step of acquiring a relative position and a relative orientation of the identifying figure with respect to a first keypoint-descriptor pair of the image of a sample article consists in acquiring the relative position of the characteristic points arranged in the image of a sample article with respect to the first keypoint-descriptor pair of the image of a sample article;

the stage of defining, in the first image, a plurality of duplicate articles, an identifying figure of projection having a relative position and orientation with respect to the second keypoint-descriptor pair of the first image of a plurality of duplicate articles which are identical with respect to the relative position and orientation assumed by the identifying figure arranged in the image of a sample article with respect to the first keypoint-descriptor pair of the image of a sample article, consists in defining, in the first image, a plurality of duplicate articles of the characteristic points of projection each having a relative position with respect to the second keypoint-descriptor pair of the first image of a plurality of duplicate articles, which position is identical to the relative position assumed by a corresponding characteristic point arranged in the image of a sample article with respect to the first keypoint-descriptor pair of the image of a sample article;

the step of grouping together identifying figures of projection each having a predetermined degree of superposition consists in grouping together characteristic points of projection having among them a defined relation of proximity;

the step of defining a representative figure for each group of identifying figures of projection consists in defining, for each group of characteristic points of projection thus formed, a characteristic representative point equivalent to a characteristic point of projection of a corresponding representative figure in order to estimate the position of a corresponding article illustrated in the first image of a plurality of duplicate articles.

The step of grouping together (clustering) characteristic points of projection having among them a defined relation of proximity can be implemented by the known mean shift algorithm [J], by means of which it is possible to obtain a representative point (also known as the cluster center) for each above-cited group. Thereafter it is possible to associate to each of these representative points of projection an identifying figure of projection such that the identifying figure best approximates, with its characteristic points of projection, groups of representative points which are identifiable in the first image of a plurality of duplicate articles. It is specified that the identifying figure of projection just described identifies, in this context, a representative figure.

The step of acquiring the relative position of each characteristic point arranged in the image of a sample article with respect to the first keypoint-descriptor pair of the image of a sample article can consist in defining a corresponding vector of displacement, the modulus of which is the distance between the characteristic point and the first keypoint-descriptor pair and the direction of which is established by the straight line conjoining the characteristic point with the first keypoint-descriptor pair.

It is advantageously possible to define a method for picking up articles arranged loosely in a storage zone of articles and for positioning the articles in an outlet station, which method comprises: application of the steps of the above-described segmentation method, in which the first image of a plurality of duplicate articles is obtained by acquiring a first image of a plurality of duplicate articles arranged loosely in an article storage zone; and additionally the picking-up of an article illustrated in the first image of a plurality of duplicate articles, to which corresponds a relative representative figure, and the positioning of the article at an outlet station.

If at least a characteristic point of projection is also a suitable point for the picking-up of the article, the article can be picked up at the characteristic point of projection of the relative representative figure.

By way of example, it is possible to identify, in the sample article, the center of gravity as a characteristic picking-up point, or, if the article is oblong, two characteristic points arranged on the axis of development of the article; these characteristic picking-up points are suitable for example for applications of the pick and place type, in which sucker means are used for picking up. If, for the sake of simplicity, the transformation is also Euclidean, the characteristic points of projection of the representative figure are suitable points for picking up the object.

In the hypothesis that the articles are at least partially superposed, it is possible to recognize the degree of mutual superposition of the articles and establish an order of collection. For this purpose, further steps can be included of: detecting the representative figures which in the first image of a plurality of duplicate articles intersect one another; detecting the corresponding common areas of intersection of the representative figures which intersect; identifying the keypoint-descriptor pairs of the first image of a plurality of duplicate articles which fall within these common intersection areas; identifying to which identifying figures of projection the keypoint-descriptor pairs of the first image of a plurality of duplicate articles are associated; identifying to which representative figures which intersect one another the identifying figures of projection are associated in order to establish in which relation of mutual superposing the articles illustrated in the first image of a plurality of duplicate articles are in, to which correspond the representative figures which mutually intersect; and establishing a picking-up order for these articles.

By way of example, a possible picking-up order of the articles is as follows: picking-up the articles to which corresponding representative figures correspond and, if among these articles some are partially superposed (in the sense that the associated representative figures are superposed), picking up from among the superposed articles the article which is placed highest, i.e. the article which is on top of the others. For a pick-and-place application, in which the height of the articles is substantially the same even if the articles are superposed on one another in several layers (for example in the case of articles which have a limited thickness), the above-described method steps advantageously enable picking up the article with good precision and rapidly in order to bear it to the outlet station.

If on the other hand the articles are arranged even in numerous superposed layers, for example internally of a container or in an area where in both cases the articles are arranged to form random piles and troughs, it is possible to include a shaking of the articles which tends to level the pile so that the upper layer is substantially horizontal; if the upper layer exhibits a substantially known height, it is also possible to apply the above method steps to good advantage.

If the articles are substantially planar (e.g. shampoos, blister packs, etc.), or elongate (e.g. mascara) their leveling in the storage area (a storage area or a container, for example), is such that they prevalently become arranged with a practically horizontal lie; in other words the storage zone contains a number of articles arranged in a more or less horizontal lie. If the first image of a plurality of duplicate articles and the image of the sample article are taken substantially from a same point of view, and if the image of the sample article is taken with the article arranged with a substantially horizontal lie, the method in question will certainly very much more effective, as it will identify representative figures which will more precisely and accurately estimate the position of the articles.

The method can also not generate representative figures for groups formed by only a few identifying figures of projection (for example one or two identifying figures of projection); the method will advantageously be more reliable as the only articles to be picked up will be those formed by a sufficiently high number of identifying figures of projection. In this way representative figures of projection would be advantageously discarded (which would form not sufficiently numerous groups for the definition of a representative figure) which would be identified by keypoint-descriptor pairs of the first image of a plurality of duplicate articles which pairs would fall on an article which for example has a practically vertical lie.

With articles having a practically vertical lie, the number of keypoint-descriptor pairs identified is generally lower than for articles having a substantially horizontal lie, as the latter offer a greater surface of exposition.

Contrarily, if there is no leveling of the articles (for example with agitating means applied to the rest surface of the articles or the containers where the articles are contained) and/or it is necessary to know the height at which the articles are arranged in three-dimensional space in order to optimize the stages of the picking-up, (increase in mean velocity and precision during the picking-up steps) further additional steps can be provided for estimating the third dimension for the pick-up point of an article to which a representative figure corresponds. For this purpose the further steps comprise:

acquiring a second image of a plurality of duplicate articles which are arranged loosely in the storage zone of articles, the second image being taken from a point of view which is different from the point of view from which the first image of a plurality of duplicate articles has been taken;

calculating the keypoints of the second image of the plurality of duplicate articles and the corresponding descriptors in order to obtain a respective plurality of keypoint-descriptor pairs of the second image of the plurality of duplicate articles;

performing the matching of the keypoint-descriptor pairs of the first image of a plurality of duplicate articles with the keypoint-descriptor pairs of the second image of a plurality of duplicate articles in order to define correspondence of similarity between keypoint-descriptor pairs of the first image of a plurality of duplicate articles and the keypoint-descriptor pairs of the second image of a plurality of duplicate articles;

selecting a keypoint-descriptor pair of the first image of a plurality of duplicate articles having a match with a keypoint-descriptor pair in the second image of a plurality of duplicate articles in order to approximate the position of the at least a characteristic point of projection which is also a suitable point for picking up the article;

estimating the position in three-dimensional space of the keypoint-descriptor pair thus selected and associating it to the characteristic point of projection which is also a suitable point for picking up the article.

The fact of having a good approximate knowledge of the position in three-dimensional space of the pick-up points of the articles arranged in the storage zone to which corresponding representative figures are associated advantageously enables moving the pick-up organs with high precision and rapidity, minimizing the times required for picking-up the articles and transferring them into the outlet station.

Note also that the fact of picking up only non-occluded objects from other articles enables a new first image to be obtained of a plurality of duplicate articles (and also a new second image if the estimation of the third dimension, as described above, is necessary) after various picking-up operations from the storage zone, as advantageously the picking-up of the articles does not alter the position of the adjacent articles, which stays unchanged (there are in fact no impacts among adjacent articles during the picking-up thereof).

With the acquiring of only a first image of a plurality of duplicate articles in the storage zone it is therefore possible to pick up a plurality of articles, which minimizes the calculating procedures and consequently enables greater productivity; with the acquiring of each first image of the plurality of articles it is actually possible to pick up the totality of articles arranged in the storage zone to which a representative figure is associated.

Further, the application of the present method can comprise the image or rotated images of the sample article to be acquired once only in an initial step of the method, such that the calculation of the corresponding keypoint-descriptor pairs can be pre-stored an identifying figure defined (this can be defined directly by the user on the basis of the type of article in use). Thereafter a first image is periodically acquired (and if required also the second image taken from a different point of view) of the plurality of duplicate and processed articles according to the above-cited steps of the method.

The stage of calculating the keypoints of the image or images of a sample article and the corresponding descriptors for obtaining a respective plurality of keypoint-descriptor pairs of the image of a sample article, the stage of calculating the keypoints of the first image of the plurality of duplicate articles and the corresponding descriptors for obtaining a respective plurality of keypoint-descriptor pairs of the first image of the plurality of duplicate articles, the step of performing a matching of the keypoint-descriptor pairs of the image of a sample article with the keypoint-descriptor pairs of the first image of a plurality of duplicate articles in order to define correspondences of similarities among keypoint-descriptor pairs of the image of a sample article and the keypoint-descriptor pairs of the first image of a plurality of duplicate articles, the step of calculating the keypoints of the second image of the plurality of duplicate articles and the corresponding descriptors for obtaining a respective plurality of keypoint-descriptor pairs of the second image of the plurality of duplicate articles, and the stage of performing the matching of the keypoint-descriptor pairs of the first image of a plurality of duplicate articles with the keypoint-descriptor pairs of the second image of a plurality of duplicate articles in order to define correspondences of similarities among keypoint-descriptor pairs of the first image of a plurality of duplicate articles can be performed by a SIFT [G] or SURF [L] procedure, or one based on HOG [K].

SIFT and SURF in particular have the characteristic of being partially unvarying with regard to lighting conditions to which the sample article and the plurality of duplicate articles are subjected at the moment of acquisition of the relative images. This is advantageous as for the acquiring of the images no specific lighting conditions are required, such as the use of laser sources; as a consequence, the present method is able to optimally segment even reflecting articles (e.g. mascara) or articles having semi-transparent packaging (e.g. stick-packs containing products, sterile packages made of plastic for containing pharmaceutical products) in particular if the lighting conditions are ordinary, i.e. if no use of laser sources is provided (the laser beam tends to pass through packages or semi-transparent products) and/or particularly intense light sources. The lighting environment can thus be normal, requiring no special lighting conditions (use of lasers, uniformity of the lighting environment for distinguishing the articles from the background, etc.); thus a considerable saving is made in terms of costs, with also a considerable simplification of the lighting system used.

In addition, the use of the mean shift algorithm (or in general an algorithm grouping characteristic points of projection and providing a representative point for each group thus formed having a position calculated as a mean of the positions of the characteristic points of projection of the corresponding group) performs for this purpose a filter effect in a case of light reflection by one or more articles at the moment of acquiring the first and second image of a plurality of articles; and undesired reflection can in some cases induce SIFT or SURF (notwithstanding the fact that they are partially insensitive to variations in lighting) to generate one or more "false" keypoint-descriptor pairs having a match, which leads to the definition of wrong characteristic points of projection. These wrong characteristic points of projection are usually those which in a group (or cluster) are furthest from the other characteristic points of projection of the same group, which other points can be considered to be correct. The calculation of the position of the representative point or center of the cluster is advantageously only slightly affected by the position assumed by the wrong characteristic point of projection, as in the calculation also the position of the other characteristic points of projection constituting the group considered to be correct has a significant effect.

In general, the false keypoint-descriptor pairs have a progressively lower relevance in relation to the greater number of keypoint-descriptor pairs of the first image having a match with keypoint-descriptor pairs of one or more images of the sample article: in fact, a greater number of characteristic projection points as a mean for each group reduces the relevance of any erroneous characteristic point of projection. From this point of view too, it is very advantageous to acquire a greater number of images of the sample article to be used in the actuation of the present method.

The above is true not only if the false keypoint-descriptor pairs are imputable to reflections from articles at the moment of acquisition of the first or second image of the articles, but also generally in a case of generation of keypoint-descriptor pairs which are faulty or wrong due to the pre-selected method of characteristics and matching extraction.

In association with the method for picking up articles arranged loosely in a storage zone of articles and for positioning the articles in an outlet station, it is also possible to define a corresponding group for actuating the method, comprising: means for picking up at least an article from a storage zone of duplicate articles arranged loosely and for acquiring one or more images of a plurality of duplicate articles arranged in the storage zone of articles from one or more different points of view and for acquiring one or more images of a sample article; a control unit for receiving the data from the acquiring means and for controlling the pick-up and place means.

In addition, the group can comprise shaker means of the duplicate articles arranged in the storage zone of duplicate articles in order to arranged them such that the relative upper layer thereof is substantially uniform.

The group thus defined can advantageously be used for supplying an article packaging machine: in this case it is necessary to functionally connect the outlet station of the group to the packaging machine. The articles to be packed can be for example cosmetic or medical products, such as mascara, shampoo, blister packs, etc.

In the technical sector relating to article-packing apparatus, a conventional apparatus for packing articles comprises: an article loading hopper; a supply system which receives the articles released by the hopper and arranges them in an ordered fashion on an outlet line; and a packaging machine connected to the outlet line of the supply system.

A known-type supply system comprises: an advancement line, continuously activated or step-activation; a pre-supply group which receives the articles from the hopper and arranges them in an ordered fashion on the advancement line in one or two flanked lines, for example; an acquiring group arranged downstream of the pre-supply group, comprising a t.v. camera arranged above the line for acquiring bidimensional images of the advancing articles, lights and/or laser sources, arranged above the line for lighting the area in which the images are acquired; a robot for picking up the articles from the advancement line and for positioning them, in a predetermined step and/or orientation, at the outlet station of the supply system, and a control unit which receives the data from the t.v. camera and controls the robot.

The control unit receives data from the t.v. camera relating to the relative orientation of each advancing article on the line; on the basis of this data, the control unit commands the functioning of the robot to arrange each article in outlet from the supply system according to the production specifications requested. A supply line of a packing machine can be provided in outlet from the supply system, on which supply line the articles are to be arranged at a predetermined step and orientation; alternatively, the supply line moves crates or containers internally of which the robot is to arrange articles side-by-side with one another.

The presence of the control unit enables the robot to be controlled according to the requested production specifications; a change of format of the articles requires simple and rapid interventions on the robot (e.g. replacement or adjustment of the gripping organs).

The known-type acquiring group described above requires that the articles to be picked up be conveyed one after another; this group is not able to manipulate partially-superposed articles, for example loosely-arranged articles.

A drawback of these supply systems is connected to the poor or non-existent adaptability of the means (e.g. agitating devices connected to guide channels for channeling the articles) which are part of the pre-supply group, when there is a format change: in some cases, an article format change requires the substitution of the whole pre-supply group.

The same problems are encountered with greater frequency when it is necessary to supply a new type of article with the supply system.

Also worthy of note is how the lighting system is particularly complex and expensive: it comprises a laser source and/or appropriately-positioned lamps in order to create a sufficiently intense and uniform light in the acquiring zone of the images of the articles.

The above-described drawbacks are effectively resolved with the use of the group of the present invention intended to replace the above-cited acquiring group; in fact the pre-supply group becomes superfluous as the group of the invention is by itself able to pick up articles arranged loosely, without any need for a preceding ordered arrangement, for example in a line. These loosely-arranged articles can be released by the hopper internally of containers arranged on the advancement line or released directly onto the advancement line. An article format change or a change of the type of article can require an initial acquisition step of one or more rotated images of a sample article, which requires a very limited amount of time and in any case a much shorter time than what is required in the prior art for functional devices and units of the pre-supply group.

It is specified that each new format or article used can also be memorized in order to form an electronic data-base, which can be accessed any time there is a re-utilization of the same articles or formats of articles already used previously, according to production specifications. In this case it is advantageously unnecessary to include an initial acquisition step, as it is sufficient to recall the already-acquired data.

The new supply system as defined above, i.e. comprising the group of the invention and not using the pre-supply group, also advantageously involves limited costs and dimensions.

The lighting conditions used can also be ordinary, as mentioned herein above in the case of use of characteristic- and matching-extraction methods partially unvarying with regard to conditions of illumination and an algorithm of the mean shift type, or another type defining representative points (cluster centers) the position of which is calculated as a mean of the positions of the characteristic points of projection of the corresponding group.

BRIEF DESCRIPTION OF THE DRAWINGS

Specific embodiments of the invention, and advantageous technical-functional characteristics thereof correlated to the embodiments only in part derivable from the above description will be described herein below in accordance with what is set out in the claims and with the aid of the accompanying figures of the drawings, in which:

FIG. 6 is a schematic image of an apparatus for packaging articles in which a group is used, which group is also an object of the invention, for picking up articles loosely arranged in a storage zone of articles and for positioning the articles in an outlet station.

DESCRIPTION OF THE PREFERRED EMBODIMENTS OF THE INVENTION

Figure 1:
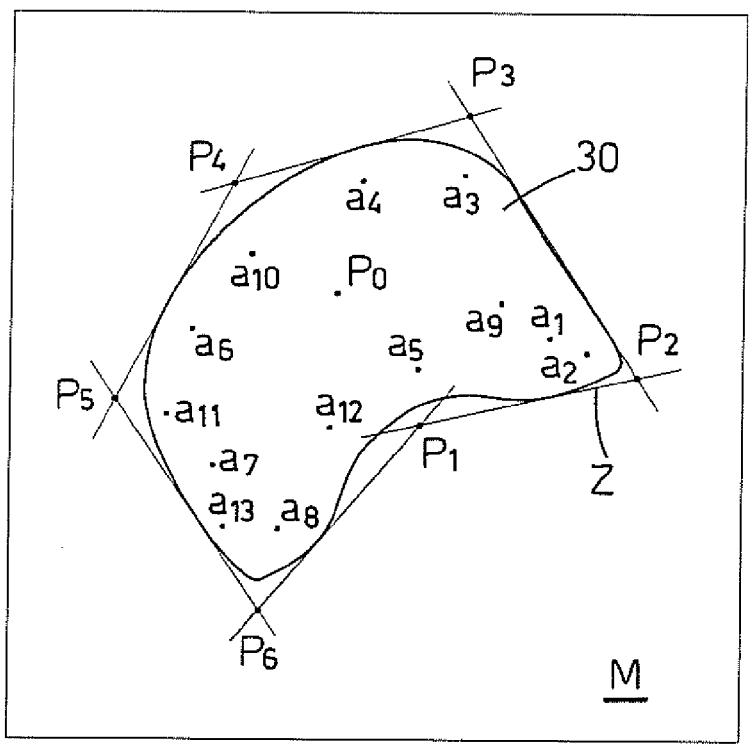
FIG. 1 is an image of a sample article and a first image of two partially-superposed duplicate articles, the images having been acquired from a same point of view and relating to a first succession of steps implemented by the segmentation method based on the characteristics of the invention.
Figure 1:
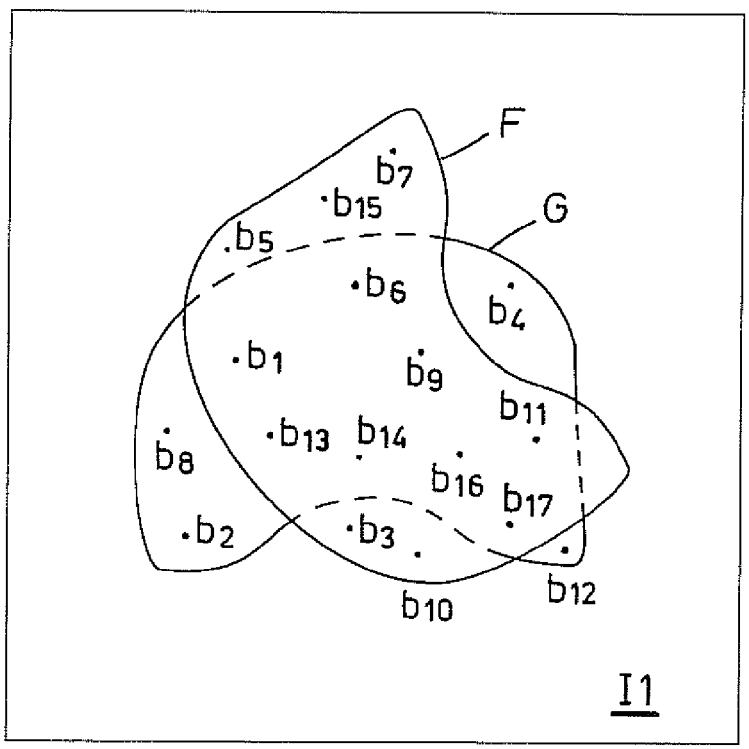

FIG. 6 illustrates an apparatus for packaging articles, indicated in its entirety by reference number 1, comprising: a loading hopper 2 of articles 3 that are identical to one another (in the following these articles 3 will also be referred to as duplicate articles, or, for the sake of brevity, as articles); a first conveyor belt 4 which moves a plurality of containers 5 intermittently in a supply direction V1, which plurality of containers 5 is destined to receive the articles released by the hopper 2; a group 10, object of the present invention, for picking up the articles 3 arranged loosely internally of the containers 5 and for placing them at a relative outlet station SU; a second conveyor belt 6 which receives the articles 3, released in a predetermined order by the group 10, and moves them in a supply direction V2; and a packaging machine 7 arranged downstream of the second conveyor belt 6 for receiving the articles moved thereby.

The group 10 of the present invention comprises: the outlet station SY; a robot 8 or pick and place means for picking up the articles 3 arranged internally of a container 5 which is stationary in a picking-up section of the first conveyor belt 4 and for placing the articles 3 thus collected at the outlet SU, i.e. in the illustrated example on the second conveyor belt 6; two t.v. cameras, a first 11 and a second 12, for acquiring, from different points of view, one or more images of a plurality of duplicate articles 3 arranged internally of the container 5 and for acquiring one or more images of a sample article 30 (shown in FIG. 1), as will clearly emerge in the following; a control unit 13 for receiving the data from the t.v. cameras 11, 12 and for controlling the robot 8.

The articles 3 release by the hopper 2 accumulate randomly internally of an underlying container 5 which is paused, and which is moved thereafter towards the pick-up section 9; each container filled with articles 3 thus is a loosely-arranged article storage zone.

Alternatively the articles 3 might be directly released on the first conveyor belt 4, which might be provided with suitable lateral retaining sides of the articles 3 (not illustrated).

The articles have, for example, a substantially planar or elongate shape.

The articles 3 released by the hopper 2 into an underlying container 5 can be arranged irregularly, forming for example troughs and/or piles; agitating means (not illustrated) applied to the containers 5 (or to the first conveyor belt 4) can be included for leveling the articles 3 contained therein such that they re-distribute forming a uniform upper layer, more regular, which is substantially horizontal. In this way, the articles 3 more probably take on, inside the container 5, a substantially horizontal lie, which is advantageous for reasons which will become clear herein below.

The group 10 of the invention actuates a corresponding method for picking up articles 3 arranged loosely in the storage zone identified internally of a container 5 and for positioning the articles 3 in the outlet station SU; the above-cited method in turn actuates a segmentation method based on the characteristics (feature-based method) for segmenting a plurality of duplicate articles 3 arranged loosely, also an object of the present invention.

This segmentation method comprises an initial stage of acquiring an image M of a sample article (FIG. 1) taken for example by the first t.v. camera 11; this sample article 30 is one from among the articles 3 (i.e. the articles 3 loaded in the hopper 2) and is arranged in the pick-up section 9 with a horizontal lie (it might be a mascara container, a blister pack containing pills, a shampoo container, etc.) and such as to be below the first t.v. camera 11. If the article is planar or oblong, it is sufficient simply to rest the sample article 30 on the first conveyor belt 4 at the relative pick-up section 9 (identifying in turn a horizontal rest plane), such that respectively its development plane or development axis is parallel to the rest plane. It is possible to acquire further images (not illustrate for the same of simplicity) of the sample article 30 by rotating the sample article 30 with respect to a perpendicular direction to the plane in which the images are acquired by the first t.v. camera 11, for reasons which will better emerge herein below; it is sufficient to acquire the further images of the sample article 30, keeping the sample article 30 resting on the horizontal surface of the first conveyor belt 4 and rotating it with respect to a vertical direction.

Once the image M has been acquired an identifying figure Z has to be defined, which approximates on the image M the shape and dimensions of the sample article 30; the identifying figure Z can be selected by the operator on consideration of the shape of the sample article 30 (and thus the articles 3 to be picked up) and in the illustrated example is a six-sided polygon including the sample article 30 (but it might be, alternatively, the minimum rectangular box including the sample article 30) and having vertices denoted as $P_1$, $P_2$, $P_3$, $P_4$; $P_5$, $P_6$. The identifying figure Z is thus identifiable from knowing the position of the relative vertices $P_1$, $P_2$, $P_3$, $P_4$, $P_5$, $P_6$ according to a reference system defined by the image M; thus the vertices $P_1$, $P_2$, $P_3$, $P_4$, $P_5$, $P_6$ of the identifying figure Z (in the following also referred-to as the characteristic outline points) are defined as characteristic points of the outline of the sample article 30. A further characteristic point of the sample article 30 is defined, i.e. point $P_0$, shown in the image M of FIG. 1; this point $P_0$ is definable by the operator and represents a suitable point for picking up the sample article (and thus any article 3) with the robot 8 (in the following this point is also referred-to as the characteristic picking-up point): by way of example this characteristic picking-up point Po identifies the center of gravity of the sample article 30 (if the article were oblong two characteristic picking-up points could be defined, for example arranged along the development axis of the article).

If a further image (or several images) of the sample article is acquired, the identifying figure Z will still exhibit the same shape and dimensions, but will be rotated by an angle to which the sample article 30 has been rotated in order to acquire the further image.

During this initial stage, also included (before or after the definition of the identifying figure Z) is a calculation of the keypoints of the image M of the sample article 30 and the corresponding descriptors in order a respective plurality of keypoint-descriptor pairs. The algorithm for the calculation of the keypoint-descriptor pairs of the image M is a feature extraction and feature matching method, such as SIFT (Scale Invariant Feature Transform) (7); in the image M of FIG. 1 the cited keypoint-descriptor pairs have been denoted by way of example as $a_1$, $a_2$, $a_3$, ... $a_{13}$. To sum up, the initial stages of the segmentation method comprise:

acquiring an image M of a sample article 30 (or several images of the sample article 30 appropriately rotated);

calculating keypoints of the image M of a sample article 30 and corresponding descriptors in order to obtain a respective plurality of keypoint-descriptor pairs $a_1$, $a_2$, $a_3$, ... $a_{13}$;

defining an identifying figure Z on the image M of a sample article 30 in order to estimate a shape of the sample article 30, the identifying figure Z being constituted in the illustrated case by a six-sided polygon having vertices $P_1$, $P_2$, ... $P_6$ and selecting a characteristic picking-up point $P_0$.

The initial acquiring stage has to be repeated each time the type of article 3 is changed in use or during an article format change 3, unless the data has not already been acquired previously and stored in the electronic data base.

Thereafter the apparatus 1 is activated to package articles 3; the hopper 2 releases articles 3 internally of an underlying container 5 in phase relation with the activation of the first conveyor belt 4. The container 5 loaded with loosely-arranged articles 3 is brought up to the picking-up section 9 and halted. At this point agitating means (as previously mentioned, not illustrated in the figures) can intervene on the container 5 in order to level the articles 3 contained therein, i.e. to give a uniform arrangement to the articles 3 such that the upper layer thereof is substantially horizontal.

A first image I1 is then acquired of the plurality of articles 3 contained internally of the container 5, which is stationary in the picking-up section 9; for the sake of simplicity, the accompanying figures reproduce the first image I1 of only two articles F, G partially superposed and arranged in a substantially horizontal lie (like the lie of the articles 3 represented in a broken line by the hopper 2 internally of a container 5 in FIG. 6); note that this description is generalized and can be extended to any number of articles 3.

Figure 2A:
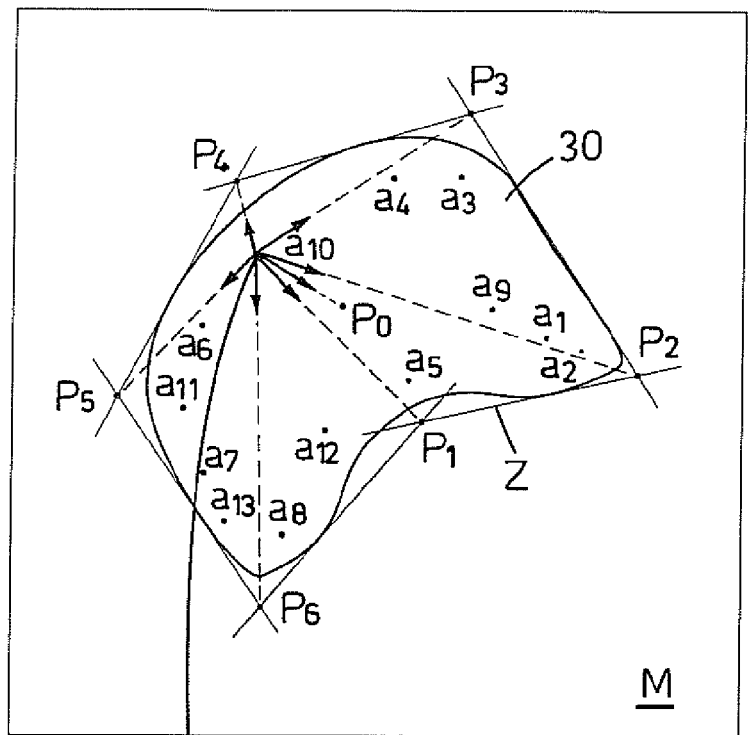
FIGS. 2A, 2B are the images of FIG. 1, with reference to a second succession of steps implemented by the segmentation method of the invention, in which only some details and graphic references have been alternatively illustrated for the sake of illustrative clarity.
Figure 2A:
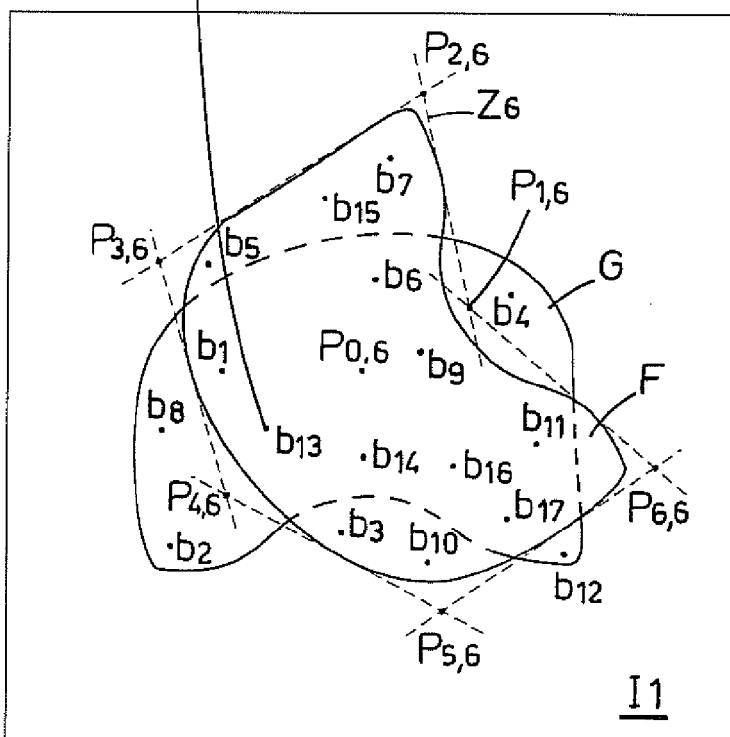
Figure 2B:
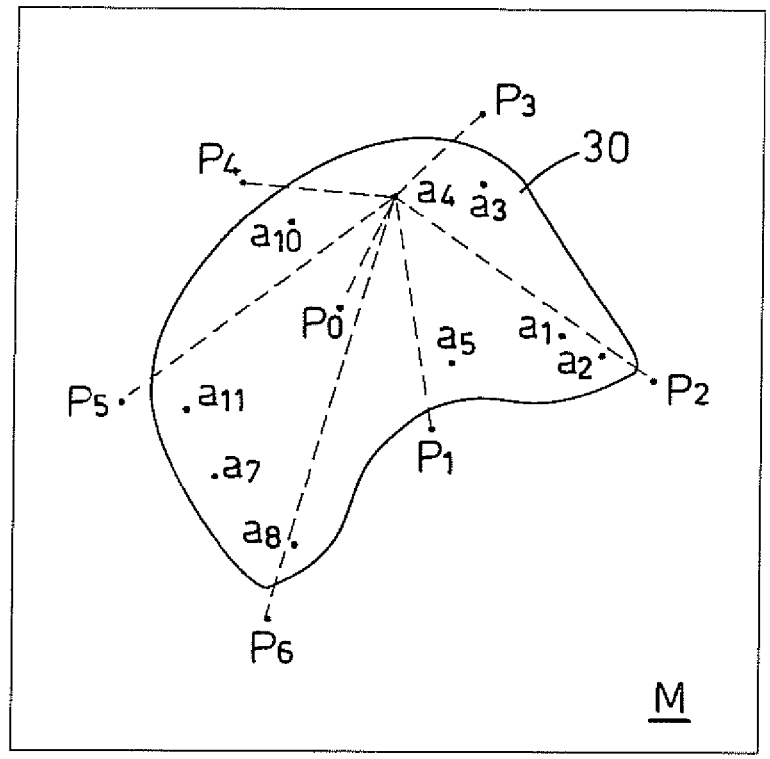
Figure 2B:
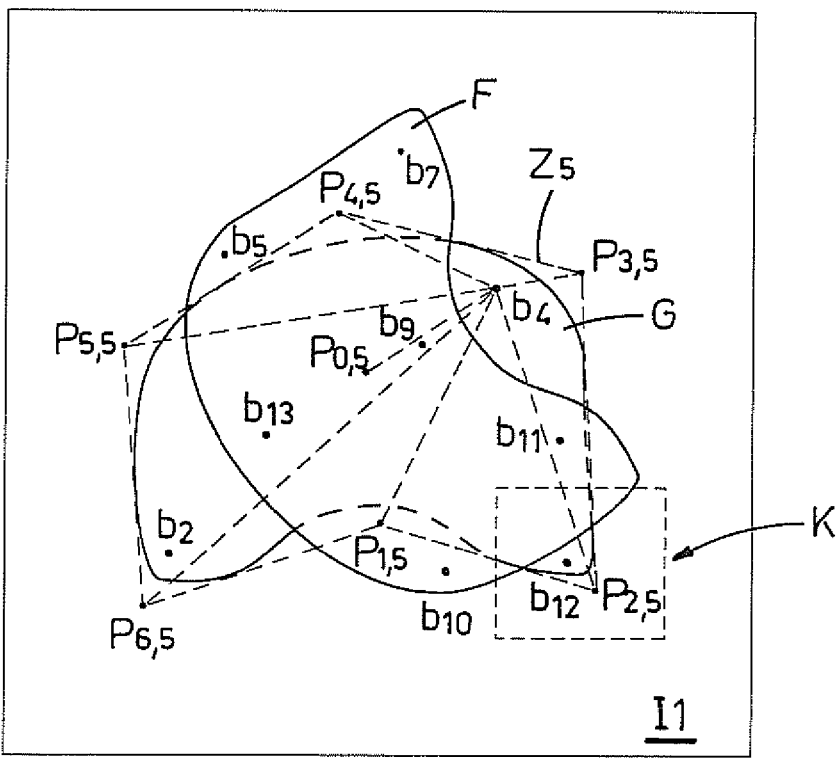

Once the initial stage has been completed and the first image I1 acquired, the segmentation method comprises steps of:

calculating, via the SIFT, the keypoints of the first image (I1) of the plurality of duplicate articles F, G and the corresponding descriptors in order to obtain a respective plurality of keypoint-descriptor pairs denoted as $b_1$, $b_2$, $b_3$ ... , $b_{17}$;

performing a matching of the keypoint-descriptor pairs $a_2$, $a_3$, ... $a_{13}$ of the image M of a sample article 30 with the keypoint-descriptor pairs $b_1$, $b_2$, $b_3$ ... , $b_{17}$ of the first image I1 in order to define similarity correspondences, once more via the SIFT;

for a first keypoint-descriptor pair $a_{10}$ of the image M having a match with a second keypoint-descriptor pair $b_{13}$ of the first image I1, defining a group of seven displacement vectors having a direction being the conjoining point between the first keypoint-descriptor pair $a_{10}$ and respectively a characteristic point $P_0$, $P_1$, ... $P_6$ of the identifying figure Z and as a distance module between the first keypoint-descriptor pair $a_{10}$ and respectively a characteristic point $P_0$, $P_1$, ... P6 (see image M, FIG. 2A), and storing the relative angle between the main direction of the keypoint of the first keypoint-descriptor pair $a_{10}$ with respect to the direction of the group of seven displacement vectors;

returning the point of application of the above-cited seven displacement vectors into the second keypoint-descriptor pair $b_{13}$ of the first image I1, rotating the second displacement vectors by an equal angle to the angle between the main direction of the keypoint of the first keypoint-descriptor pair $a_{10}$ and the main direction of the keypoint of the second keypoint-descriptor pair $b_{13}$ and acquiring data (module, direction) of the second thus-rotated displacement vectors of the corresponding characteristic point of projection $P_{0.6}$, $P_{1.6}$, ... , $P_{6.6}$ (FIG. 2A), which can also be referable as the characteristic point of projection of P0.6 and as characteristic points of projection $P_{1.6}$, ... $P_{6.6}$ of an identifying figure of projection $Z_6$ obtained as a Euclidean transformation of the identifying figure Z with reference to the match between the keypoint-descriptor pair $a_{10}$ and the second keypoint-descriptor pair $b_{13}$;

applying the two preceding steps for all the keypoint-descriptor pairs of the image M of the sample article 30 having a match with a keypoint-descriptor pair of the first image I1 of the plurality of duplicate articles 3 (see the further example illustrated in FIG. 2B);

applying the mean shift algorithm (10) for clustering characteristic points of projection having an establish proximity relation (see for example points $P_{2.1}$, $P_{2.5}$, $P_{2.8}$ of FIG. 3) and in order to define for each cluster thus-obtained a representative point, also known by a technical expert as a cluster center (point $C_7$ of FIG. 3), picking-up points thus being defined in the cluster centers, i.e. cluster centers obtained by groups of characteristic points of projection for picking-up, and cluster centers of edge points (point $C_7$ of FIG. 3), i.e. cluster centers obtained from groups of characteristic points of projection of edges;

discarding the cluster centers obtained from groups of characteristic points of projection formed by a number of characteristic points of projection which are lower than a determined number (for example three);

defining representative figures F1, G1 (FIG. 4) having a same shape and the identifying figure Z, positioned in the first image I1 such that the relative vertices $P1^F$, $P_2^F$, $P_3^F$, $P_4^F$, $P_5^F$, $P_6^F$, and $P_1^G$, $P_2^G$, $P_3^G$, $P_4^G$, $P_5^G$, $P_6^G$ approximate corresponding cluster centers of edge points (see point $P_2^G$ in FIG. 3, which approximates point $C_7$, representing a cluster center of and edge point), each representative figure F1, G1 thus estimating a position of a corresponding article F, G arranged loosely in the article storage zone.

FIGS. 2A, 2B, 3, 4, 5 do not relate to a real case; they illustrate graphic representations which have only an indicative value for better understanding of the invention. In the following part of the description reference will also be made to the fictional shown in the figures, with some generalizations.

FIG. 2A illustrates all the keypoint-descriptor pairs $a_1, a_2, a_3, \ldots a_{13}$ of the image M and the keypoint-descriptor pairs denoted as $b_1, b_2, b_3, \ldots b_{17}$ generated with the SIFT. FIG. 2B, for the sake of simplicity, illustrates only the keypoint-descriptor pairs of the image M and of the first image I1 having a match: overall there are nine matches in the example. The matches can be numbered and identified with reference $m_j(a_h, b_k)$, with h comprised between 1 and 13, k comprised between 1 and 17 and in which j is a variable number between 1 and 9 for indicating the number of matches; for example the identified matches can be $m_1(a_2, b_{12})$, $m_2(a_1, b_7)$, $m_3(a_5, b_9)$, $m_4(a_3, b_5)$, $m_5(a_4, b_4)$, $m_6(a_{10}, b_{13})$, $m_7(a_{11}, b_{10})$, $m_8(a_8, b_2)$, $m_9(a_7, b_{11})$. The match $m_6(a_{10}, b_{13})$ indicates match number 6 between the first keypoint-descriptor pair $a_{10}$ of image M and the second keypoint-descriptor pair $b_{13}$ of the first image I1 (FIG. 2A), while match $m_5(a_4, b_4)$ indicates match number 5 between the first keypoint-descriptor pair $a_4$ of the image M and the second keypoint-descriptor pair $b_4$ of the first image I1 (FIG. 2B). For each match a corresponding identifying figure of projection (nine in total) is obtained, identifiable by means of a subscript which reports the number of the associated match: for example the identifying figure of projection $Z_6$ (FIG. 2A) is associated to the match $m_5(a_{10}, b_{13})$, while the identifying figure of projection $Z_5$ (FIG. 2B) is associated to match $m_5(a_4, b_4)$.

The characteristic points of projection of each identifying figure of projection $Z_j$, $j=1, \ldots, 9$, have been represented as $p_{k\ldots j}$ K=0, 1, \ldots, 6 (in FIG. 2A the identifying figure of projection $Z_6$ is identifiable via the characteristic points of projection $P_{0.6}, P_{1.6}, \ldots, P_{6.6}$, while in FIG. 2B the identifying figure of projection $Z_5$ is identifiable by the characteristic points of projection $P_{0.0}, P_{1.5}, P_{6.5}$).

Figure 3:
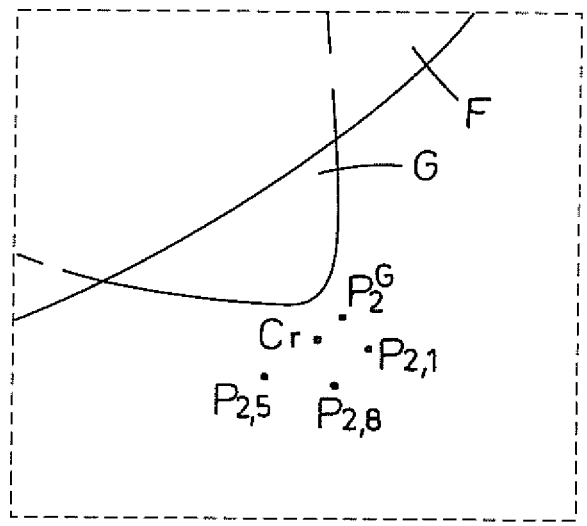
FIG. 3 is an enlarged view of detail K of FIG. 2B in which some additional graphic references are illustrated.

With reference to FIG. 2B, the keypoint-descriptor pairs having a match and which are on article G are three in number, i.e. $b_2, b_4, b_{12}$: identifying figures of projection $Z_8, Z_5, Z_1$ are respectively associated to these pairs, of which figures of projection $Z_8, Z_5, Z_1$ only $Z_5$ is represented in FIG. 2B for the sake of simplicity. Respective characteristic points of projection are associated to these identifying figures of projection $Z_8, Z_5, Z_1$ (in FIG. 2B the characteristic points of projection of the identifying figure of projection $Z_5$ is represented, i.e. points $P_{0.0}, P_{1.5}, \ldots P_{6.5}$). FIG. 3 shows an enlarged area (detail K of FIG. 2B) in which the characteristic points of projection $P_{2.8}, P_{2.5}, P_{2.1}$ are included; the application of the mean shift algorithm groups these characteristic edge points of projection and defines a cluster center of edge point $C_r$, where r is a cluster; each cluster can have a variable number of characteristic points of projection.

Still with reference to FIGS. 2A, 2B, the keypoint-descriptor pairs having a match which fall on article F are six in number, i.e. $b_5, b_7, b_9, b_{10}, b_{11}, b_{13}$ and to these are respectively associated identifying figures of projection $Z_4, Z_2, Z_3, Z_7, Z_9, Z_6$ of which only the identifying figure of projection $Z_8$ is represented in FIG. 2A for the sake of simplicity. The corresponding cluster centers of the picking-up point and the cluster centers of the edge point will presumably be seven in number and be each formed by six elements (it is once more specified that the example considered in the figures is only indicative and does not relate to a real case).

In general, some clusters can group, for example, only one or at most two characteristic points of projection; it has been found that these are usually associated to a keypoint-descriptor pair of the first image I1 which falls on an article arranged in the storage zone in a non-horizontal lie. In this case it is advisable to discard the above-cited cluster (see the corresponding step of the method as reported herein above), such that it is not considered in the successive step of the method relating to the definition of the representative figures, as will emerge more clearly herein below.

The case illustrated in FIG. 3 relates to the problem of defining the representative figure G1 for estimating the position of article G in the container 5. As has been said, representative figure G1 is selected such that the relative vertices $P_1^G, P_2^G, P_3^G, P_4^G, P_5^G, P_6^G$ approximate corresponding cluster centers of edge points defined in the first image I1, one of these clusters being indicated with C, in FIG. 3 and being formed by the characteristic edge points of projection $P_{2.5}, F_{2.5}, P_{2.1}$.

The step of defining representative figures thus includes considering all the valid cluster centers (i.e. those which have not been discharged) of the edge points identified in the first image I1; thus sets are localized comprising six cluster centers of edge points associable to a representative figure having vertices which respectively approximate the position of the cluster centers of edge points.

It should be remembered that the identifying figures of projection are rototranslations in the plane of the first image I1 of the identifying figure Z defined in the plane of the image M of the sample article 30; this identifying figure Z approximates the shape of the sample article 30 arranged in a horizontal lie; the method of the present embodiment is thus effective for segmenting articles 3 which are arranged in a horizontal or substantially-horizontal axis (articles inclined by an angle of about 20° with respect to the horizontal plane). For articles 3 with a greater degree of inclination the method is less reliable, so that it is preferable that thus-inclined articles are not segmented; to this end, it is sufficient not to consider clusters having few elements (e.g. one or at most two), i.e. these clusters can be discarded such that they will not be taken into consideration during the step of defining the representative figures, as has been comprised. Articles 3 acquired in the first image I1 and having a horizontal lie or a substantially horizontal lie offer a larger surface of exposition than inclined articles (as mentioned, inclined by over 20° with respect to the horizontal plane); it has been verified that more keypoint-descriptor pairs of the first image I1 fall on those articles 3 having a horizontal or substantially-horizontal lie; characteristic points of projection will therefore be associated to these pairs, which will form corresponding clusters constituted by a greater number of elements.

Consequently, it becomes important that on the first image I1 there is a large number of keypoint-descriptor pairs; this number of pairs can be increased by applying the above-mentioned initial steps of the method to a plurality of images of the sample article 30 which are obtained by rotating the sample article 30 with respect to a vertical direction, as already mentioned.

Considering only clusters having a certain number of elements (for example at least three) presents various advantages: firstly the segmentation is more accurate, as the representative figures generated more precisely estimate the position of corresponding articles because the mean shift procedure has processed a sufficiently large number of elements; and secondly the segmentation is more reliable as clusters having few elements (characteristic points of projection) are not taken into consideration, which elements would probably be linked to keypoint-descriptor pairs falling on inclined articles whose position would not be estimated satisfactorily by the present segmentation method.

The cluster centers of picking-up points $P_0^F$, $P_0^G$ have also been obtained by application of the mean shift algorithm: they therefore respectively represent an estimation of the position of picking-up points of the articles F, G.

It is specified that a corresponding cluster center of a picking-up point is associable to each representative figure: in an aspect of the invention, the step of defining representative figures can comprise considering not only the cluster centers of the edge points identified in the first image I1 but also the cluster centers of the picking-up point.

The segmentation of the plurality of articles 3 loosely arranged in the storage zone (container 5 stations in the pick-up section 9) enables a satisfactory estimation to be made of the position of the articles 3 belonging to the plurality of articles 3 which have a horizontal or a substantially horizontal lie. If the articles are not even partially superposed, it is possible to perform the picking-up operation of the articles 3 by the robot 8, based on the knowledge of the position of the cluster centers of the picking-up points.

Figure 4:
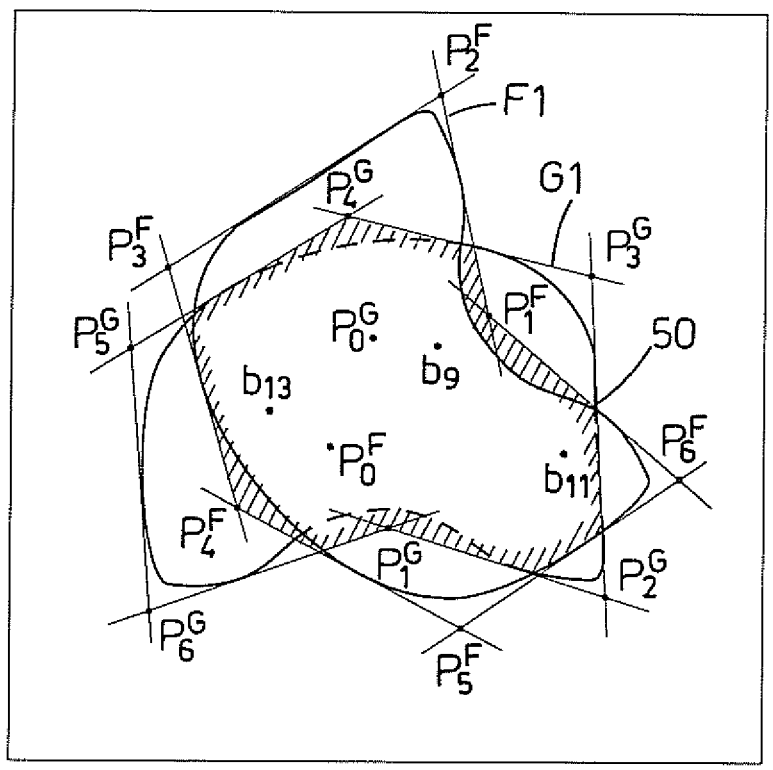
FIG. 4 is the first image of the two partially-superposed duplicate articles of FIGS. 1, 2A, 2B, with reference to a first succession of stages of a method for picking up articles arranged loosely in a storage zone of articles and for positioning the articles in an outlet station, also object of the invention.

In the case illustrated in FIG. 4, the articles F, G are instead partially superposed on one another: the area of superposing of the articles F, G is definable as the common area of intersection of the relative representative figures F1, G1 indicated in FIG. 4 with reference numeral 50. In this case the cluster centers of picking-up points $P_0^F$, $P_0^G$ are within the common area of intersection 50, such that it is necessary to find out the degree of superposing of the two articles F, G, i.e. which of the two articles is superposed on the other or in any case which cluster center of picking-up point $P_0^F$, $P_0^G$ is directly accessible by the robot 8 with the aim of picking up the corresponding article. If a cluster center of a picking-up point of a first article is accessible, in the sense that it is not occluded by a second article, the robot 8 can be activated to pick up the first article; the order of picking-up of the articles 3 in the article storage zone can follow this criterion: the robot 8 can be activated, that is, to pick up articles whose cluster centers of picking-up points are not covered by other articles; this can be verified by calculating whether a cluster center of a picking-up point falls within a common area of intersection.

In the case illustrated in FIG. 4 both the cluster centers of the picking-up points $P_0^F$, $P_0^G$ fall within a common area of intersection, and thus it is necessary to find out which of the two articles F, G to which the corresponding representative figure F1, G1 which intersect, is superposed on the other.

In order to find out whether there are superposed articles 3 and their degree of superposing (i.e. which article is superposed on the other), further steps can be provided, as follow:

acquiring the representative figures which intersect in the first image I1; in this case the only representative figures F1, G1 of the example of FIG. 4 are also representative figures which intersect each other;

acquiring the corresponding common areas of intersection of the representative figures which intersect one another; in this case the common area of intersection is the one denoted by 50;

acquiring the keypoint-descriptor of the first image I1 of a plurality of duplicate articles 3 which fall within the common areas of intersection; in this case they are the couples $b_9$, $b_{11}$, $b_{13}$;

finding out which identifying figures of projection the keypoint-descriptor pairs of the first image I1 of a plurality of duplicate articles 3 are associated to; in this case the pairs $b_9$, $b_{11}$, $b_{13}$ are associated respectively to the identifying figures of projection $Z_3$, $Z_9$, $Z_6$;

finding out to which intersecting representative figures the identifying figures of projection are associated, in order to establish the relation of mutual superposition of the articles illustrated in the first image of a plurality of duplicate articles to which correspond the representative figures that mutually intersect; in this case the identifying figures of projection $Z_3$, $Z_9$, $Z_6$ are associated to the representative figure F1, which means that the article F is superposed on the article G;

and establish a picking-up order for these articles; in this case it is necessary first to pick up article F and then article G, that is, the robot 8 is commanded to intervene on the cluster center of the picking-up point $P_0^F$, in order to grip the corresponding article F and bring it into the outlet station SU.

By way of example, a possible picking-up order of the articles 3 is the following: pick up the articles to which corresponding representative figures are associated and, if there are among these articles some which are partially superposed, pick up, from these superposed articles, the article which is arranged at a greatest height, i.e. the article superposed on the others.

If the upper layer of articles 3 is always arranged substantially at a same height, as can happen for example if the articles are not numerous and/or if they are of a limited thickness (for example, articles consisting of sheets or the like), there is no need to know the precise height at which each article 3 to be picked up is arranged, as the height is known and common for all the articles 3.

In the illustrated example, the articles 3 can be arranged internally of the container 5 up to the lip and the container 5 itself can be stationary in the picking-up section 9 up to when it is emptied by the robot 8; the height of each article 3 to be picked up is thus not constant nor known previously and it is preferably estimated in order to minimize the picking-up time by the robot 8; in particular, knowing the height at which the cluster center of the picking-up point of the corresponding article to be picked up enables optimization of appropriate acceleration and deceleration profiles of the robot 8 movement.

The steps of the method for estimating the third dimension of the cluster center of picking-up points associated to representative figures comprise:

acquiring a second image I2 of the plurality of duplicate articles 3 which are arranged loosely in the container 5, the second image being taken from a different point of view from the one the first image I1 was taken from, using the second t.v. camera 12;

calculating the keypoints of the second image I2 and the corresponding descriptors for obtaining a respective plurality of keypoint-descriptor pairs, using the SIFT;

performing the matching of the keypoint-descriptor pairs of the first image I1 with the keypoint-descriptor pairs of the second image I2 in order to define similarity correspondences between keypoint-descriptor pairs of the first image I1 and the keypoint-descriptor pairs of the second image I2, again using the SIFT;

selecting a keypoint-descriptor pair in the first image I1 which has a match with a keypoint-descriptor pair of the second image I2 in order to approximate the position of a cluster center of a picking-up point;

estimating the position in three-dimensional space of the thus-selected keypoint-descriptor pair and associating the relative height of the pair at the cluster center of the picking-up point.

Figure 5:
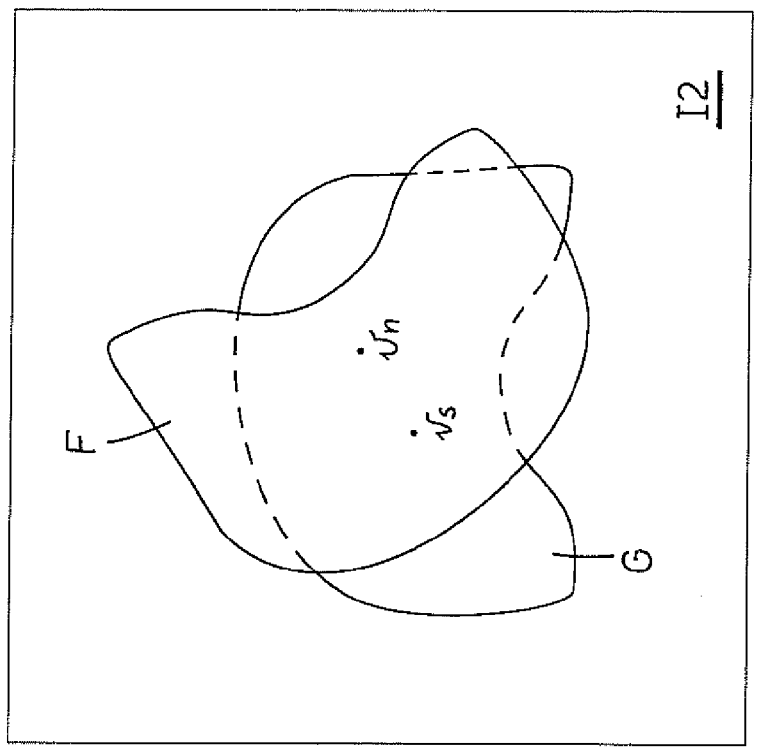
FIG. 5 is the first image of the two partially-superposed duplicate articles of FIG. 1, 2A, 2B, 4 and a second image of the articles taken from a different point of view, with reference to a second succession of stages of the method for picking up articles loosely arranged in a storage zone and for placing the articles in an outlet station.
Figure 5:
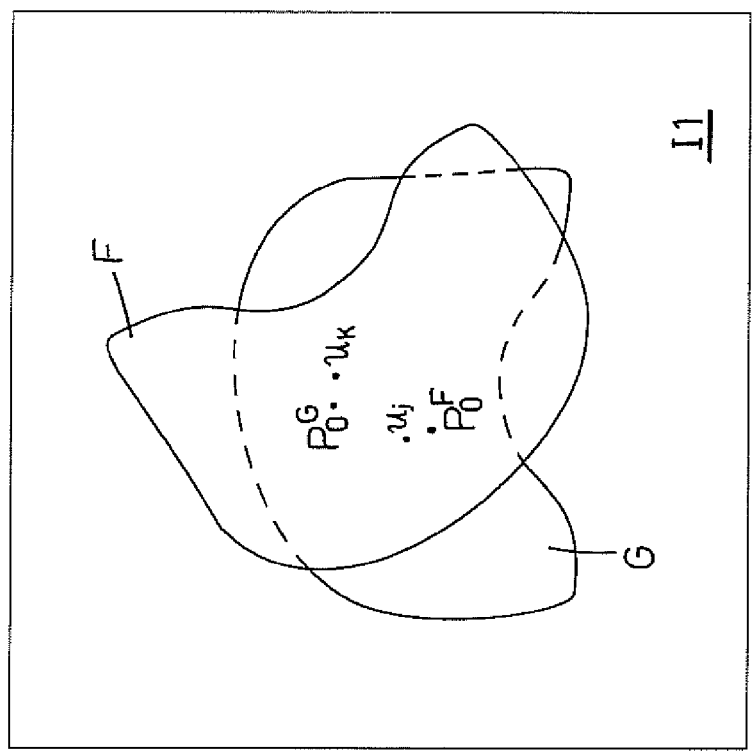

FIG. 5 illustrates, for the sake of simplicity, only two keypoint-descriptor pairs $u_j$, $u_k$ in the first image I1 having a match respectively with a same number of keypoint-descriptor pairs $v_s$, $v_n$ of the second image I2; these pairs uj, uk have been selected in order to approximate the position respectively of the cluster centers of the picking-up points $P_0^F, P_0^G$.

The keypoint-descriptor pairs $u_j, u_k$ of the first image I1 are those which are closer to the cluster centers of the picking-up point $P_0^F, P_0^G$.

The estimation of the third dimension is a known procedure to a technical expert in the sector and therefore will not be further discussed herein.

The cluster centers of the picking-up point $P_0^F, P_0^G$ can be attributed with the same spatial coordinates that correspond to the points identified by the keypoint-descriptor pairs $u_j, u_k$ having a match with the keypoint-descriptor pairs $v_s, v_n$; in particular, a single spatial coordinate of the points relating to the height can be associated to the cluster centers of the picking-up point $P_0^F, P_0^G$, as comprised in the above-described steps.

The article 3 picking-up order to which a representative figure corresponds might comprise precedingly picking up those articles which are not even partially occluded by other articles (application of the method steps for detecting areas of intersection between representative figures) and the associated picking-up cluster centers of which of are arranged higher (application of the method steps for estimating the third dimension of the pick-up cluster centers). In this way the articles 3 arranged at a greater height and not occluded by other articles 3 are picked up. This is advantageous as the robot 8 performs the picking-up of articles 3 arranged in the container 5 without the adjacent articles being accidentally displaced.

The fact of picking up only articles 3 which are not occluded by other articles 3 enables acquiring a new first image I1 (and also a new second image I2 if it becomes necessary to estimate the third dimension) after various article 3 picking-up operations from the storage zone 5, as the picking-up of the articles 3 by the robot 8 advantageously does not alter the position of the adjacent articles 3, which stays the same (in fact there are no impacts among articles 3 adjacent to an article 3 during the picking-up of the latter). With the acquiring of a first image I1 of a plurality of duplicate articles in the storage zone 5 it is therefore possible to pick up a plurality of articles, which minimizes the calculating process and consequently enables greater productivity; the maximum number of articles that can be picked up with the acquiring of a first image I1 in this way corresponds to the number of representative figures identified by the method of the invention.

During the picking-up of the articles 3 by the robot 8, the upper layer of the articles 3 arranged in the container 5 assumes a different conformation and piles and troughs can form.

Once all the articles to which a representative figure have been picked up, the method comprises acquiring a new first image I1 to establish new representative figures such as to estimate the position of corresponding articles 3 contained in the article storage zone (container 5). Before taking a new first image I1, however, it is possible to apply the agitating means to the container 5, such that the articles 3 are leveled to form a new and substantially horizontal upper layer of articles 3, for the reasons discussed herein above.

The foregoing has been described by way of non-limiting example, so that any eventual constructional variants are understood to fall within the ambit of protection of the present technical solution, as claimed herein below.

BIBLIOGRAPHICAL REFERENCES

[A] Vittorio Ferrari, Tinne Tuytelaars, and Luc Gool, "Simultaneous object recognition and segmentation from single or multiple model views," Int. J. Comput. Vision, vol. 67, no. 2, pp. 159-188, 2006.

[B] Ying Liu, Dengsheng Zhang, Guojun Lu, and WeiYing Ma, "A survey of content-based image retrieval with high-level semantics," Pattern Recognition, vol. 40, no. 1, pp. 262-282, 2007.

[C] S. Zickler and M. M. Veloso, "Detection and localization of multiple objects," in Proc. of 6th IEEERAS International Conference on Humanoid Robots, December 2006, pp. 20-25.

[D] Krisnawan Rahardja and Akio Kosaka, "Vision based bin picking: recognition and localization of multiple complex objects using simple visual cues," in 1996 IEEE/RSJ International Conference on Intelligent Robots and Systems. 1996, pp. 1448-57, IEEE Press.

[E] J. Zhang, M. Marszalek, S. Lazebnik, and C. Schmid, "Local features and kernels for classification of texture and object categories: A comprehensive study," Intl Journal of Computer Vision, vol. 73, no. 2, pp. 213-238, June 2007.

[F] P. Felzenszwalb, D. McAllester, and D. Ramanan, "A discriminatively trained multi-scale, deformable part model," in Proc. of IEEE Intl Conference on Computer Vision and Pattern Recognition, June 2008, pp. 1-8.

[G] David G. Lowe, "Distinctive image features from scale-invariant keypoints," International Journal of Computer Vision, vol. 60, no. 2, pp. 91-110, November 2004.

[H] B. Leibe, A. Leonardis, and B. Schiele, "Robust object detection with interleaved categorization and segmentation," Intl Journal of Computer Vision, vol. 77, no. 13, pp. 259-289, May 2008.

[I] T. Knoll and R. Jain, "Recognizing partially visible objects using feature indexed hypotheses," IEEE Journal of Robotics and Automation, vol. 2, no. 1, PP. 3-13, March 1986.

[J] Fukanaga, Keinosuke; Larry D. Hostetler. "The Estimation of the Gradient of a Density Function, with Applications in Pattern Recognition". IEEE Transactions on Information Theory 21 (1): 32-40, January 1975.

[K] Navneet Dalai, Bill Triggs: "Histograms of Oriented Gradients for Human Detection". Proc. of IEEE Intl Conference on Computer Vision and Pattern Recognition, vol. 1, pp. 886-893, 2005

[L] Herbert Bay, Tinne Tuytelaars and Luc Van Goo! "SURF: Speeded Up Robust Features", Proceedings of the 9th European Conference on Computer Vision, Springer LNCS volume 3951, part 1, pp 404-417, 2006.

What is claimed is:

1. A feature-based segmentation method, for segmenting a plurality of loosely-arranged duplicate articles (3), wherein the method comprises the steps of:
   a) acquiring an image (M) of a sample article (30);
   b) calculating keypoints of the image (M) of a sample article (30) and corresponding descriptors in order to obtain a respective plurality of keypoint-descriptor pairs ($a_1 \ldots a_{13}$) of the image (M) of a sample article (30);
   c) defining an identifying figure (Z) on the image of a sample article (30) in order to estimate a shape of the sample article (30) illustrated in the image (M) of a sample article (30);
   d) acquiring a first image (I1) of a plurality of duplicate articles;
   e) calculating the keypoints of the first image (I1) of the plurality of duplicate articles (3) and the corresponding descriptors in order to obtain a respective plurality of keypoint-descriptor pairs ($b_1 \ldots, b_{17}$) of the first image (I1) of the plurality of duplicate articles (3);
   f) performing a matching of the keypoint-descriptor pairs ($a_1, \ldots a_{13}$) of the image (M) of a sample article (30) with the keypoint-descriptor pairs ($b_1 \ldots b_{17}$) of the first image (I1) of a plurality of duplicate articles (3) in order to define similarity correspondences between keypoint-descriptor pairs ($a_1, \ldots a_{13}$) of the image (M) of a sample article (30) and the keypoint-descriptor pairs ($b_1, \ldots, b_{17}$) of the first image (I1) of a plurality of duplicate articles (3);

g) acquiring a relative position and a relative orientation of the identifying figure (Z) with respect to a first keypoint-descriptor pair ($a_{10}$) of the image (M) of a sample article (30) having a match with a second keypoint-descriptor pair ($b_{13}$) of the first image (I1) of a plurality of duplicate articles (3);

h) defining, in the first image (I1) of a plurality of duplicate articles (3), an identifying figure of projection ($Z_6$) having a shape and dimension which are comparable or identical to those of the identifying figure (2), which identifying figure of projection ($Z_6$) has a relative position and a relative orientation with respect to the second keypoint-descriptor pair ($b_{13}$) of the first image (I1) of a plurality of duplicate articles (3) which are identical respectively to the relative position and to the relative orientation assumed by the identifying figure (Z) arranged in the image (M) of a sample article (30) with respect to the first keypoint-descriptor pair ($a_{10}$) of the image (M) of a sample article (30);

i) applying the two preceding stages to a plurality of keypoint-descriptor pairs ($a_2, a_1, a_5, a_3, a_4, a_{10}, a_{11}, a_8, a_9$) of the image (M) of a sample article (30) having a match with a keypoint-descriptor pair ($b_{12}, b_7, b_9, b_5, b_4, b_{13}, b_{10}, b_2, b_{11}$) of the first image (I1) of a plurality of duplicate articles (3);

j) collecting together identifying figures of projection ($Z_1, \ldots, Z_9$) having between them a predetermined degree of superposing;

k) defining a representative figure ($F_1, G_1$) for each group of identifying figures of projection ($Z_1, \ldots, Z_9$) which is formed by a minimum predetermined number of identifying figures of projection ($Z_1, \ldots, Z_9$), which representative figure ($F_1, G_1$) has a same shape and dimension as an identifying figure of projection ($Z_1, \ldots, Z_9$), and is selected in order to estimate a position of a corresponding article (3) illustrated in the first image (I1) of a plurality of duplicate articles (3); and, directing an apparatus to the estimated position, and picking up the corresponding article (3) illustrated in the first image (I1) of a plurality of duplicate articles (3).

2. The segmentation method of claim 1, wherein each identifying figure of projection ($Z_1, \ldots, Z_9$) associated to a corresponding identifying figure (Z) and a first keypoint-descriptor pair ($a_{10}$) of the image (M) of a sample article (30) having a match with a second keypoint-descriptor pair ($b_{13}$) of the first image (I1) of a plurality of duplicate articles (3), is obtained as a Euclidean transformation of the identifying figure (Z).

3. The segmentation method of claim 1, wherein the image of a sample article (30) and the first image (I1) of a plurality of duplicate articles (3) are taken from substantially a same point of view.

4. The segmentation method of claim 2, wherein the image of a sample article (30) and the first image (I1) of a plurality of duplicate articles (3) are taken from substantially a same point of view.

5. The segmentation method of claim 1, wherein the sample article (30), before the image (M) is acquired of the sample article (30), is orientated in three-dimensional space in an orientation which is similar or comparable to the orientation taken on by a number of duplicate articles (3) being part of the plurality of duplicate articles (3) taken via the relative first image (I1) of a plurality of duplicate articles (3).

6. The segmentation method of claim 2, wherein the sample article (30), before the image (M) is acquired of the sample article (30), is orientated in three-dimensional space in an orientation which is similar or comparable to the orientation taken on by a number of duplicate articles (3) being part of the plurality of duplicate articles (3) taken via the relative first image (I1) of a plurality of duplicate articles (3).

7. The segmentation method of claim 3, wherein the sample article (30), before the image (M) is acquired of the sample article (30), is orientated in three-dimensional space in an orientation which is similar or comparable to the orientation taken on by a number of duplicate articles (3) being part of the plurality of duplicate articles (3) taken via the relative first image (I1) of a plurality of duplicate articles (3).

8. The segmentation method of claim 4, wherein the sample article (30), before the image (M) is acquired of the sample article (30), is orientated in three-dimensional space in an orientation which is similar or comparable to the orientation taken on by a number of duplicate articles (3) being part of the plurality of duplicate articles (3) taken via the relative first image (I1) of a plurality of duplicate articles (3).

9. The segmentation method of claim 1, wherein it acquires a plurality of images of the same sample article (30), each image of the plurality of images being distinguished by the fact that the sample article (30) is rotated in three-dimensional space by a predetermined angle with respect to a perpendicular direction to a common plane in which the plurality of images is taken, and wherein successive stages of the method are repeated for each image of the plurality of images of the sample article (30).

10. The segmentation method of claim 1, wherein:

the identifying figure (Z) on the image of a sample article (30) is identified by means of a plurality of characteristic points ($P_0, P_1, \ldots, P_6$);

the stage of acquiring the relative position and the relative orientation of the identifying figure (Z) with respect to a first keypoint-descriptor pair ($a_{10}$) of the image (M) of a sample article (30) consists in acquiring the relative position of the characteristic points ($P_0, P_1, \ldots, P_6$) arranged in the image of a sample article (30) with respect to the first keypoint-descriptor pair ($a_{10}$) of the image (M) of a sample article (30);

the stage of defining, in the first image (I1) of a plurality of duplicate articles (3), an identifying figure of projection ($Z_6$) having a relative position and a relative orientation with respect to the second keypoint-descriptor pair ($b_{13}$) of the first image (I1) of a plurality of duplicate articles (3) which are identical respectively to the relative position and the relative orientation assumed by the identifying figure (Z) arranged in the image (M) of a sample article (30) with respect to the first keypoint-descriptor pair ($a_{10}$) of the image (M) of a sample article (30) consists in defining, in the first image (I1) of a plurality of duplicate articles (3) of the characteristic points of projection ($P_{0.6}, P_{1.6}, \ldots, P_{6.6}$) each having a relative position with respect to the second keypoint-descriptor pair ($b_{13}$) of the first image (I1) of a plurality of duplicate articles (3) which is identical to the relative position assumed by a corresponding characteristic point ($P_0, P_1, \ldots, P_6$) arranged in the image of a sample article (30) with respect to the first keypoint-descriptor pair ($a_{10}$) of the image (M) of a sample article (30);

the stage of grouping together identifying figures of projection ($Z_1, \ldots, Z_9$) having a predetermined degree of mutual superposing consists in grouping together characteristic points of projection having a defined first relation of closeness;

the stage of defining a representative figure (F1, G1) for each group of identifying figures of projection ($Z_1, \ldots, Z_9$) consists in defining, for each thus-formed group of characteristic points of projection, a representative point ($C_r$) equivalent to a characteristic point of projection of a corresponding representative figure (F1, G1) in order to estimate a position of a corresponding article (3) illustrated in the first image (I1) of a plurality of duplicate articles (3).

11. A method for picking up loosely-arranged articles (3) in a storage zone of articles (3) and for positioning the articles (3) in an outlet station (SU) using a feature-based segmentation method, for first segmenting a plurality of loosely-arranged duplicate articles (3), wherein the segmentation method comprises the steps of:

a) acquiring an image (M) of a sample article (30);

b) calculating keypoints of the image (M) of a sample article (30) and corresponding descriptors in order to obtain a respective plurality of keypoint-descriptor pairs ($a_1 \ldots a_{13}$) of the image (M) of a sample article (30);

c) defining an identifying figure (Z) on the image of a sample article (30) in order to estimate a shape of the sample article (30) illustrated in the image (M) of a sample article (30);

d) acquiring a first image (I1) of a plurality of duplicate articles;

e) calculating the keypoints of the first image (I1) of the plurality of duplicate articles (3) and the corresponding descriptors in order to obtain a respective plurality of keypoint-descriptor pairs ($b_1 \ldots, b_{17}$) of the first image (I1) of the plurality of duplicate articles (3);

f) performing a matching of the keypoint-descriptor pairs ($a_1, \ldots a_{13}$) of the image (M) of a sample article (30) with the keypoint-descriptor pairs ($b_1 \ldots b_{17}$) of the first image (I1) of a plurality of duplicate articles (3) in order to define similarity correspondences between keypoint-descriptor pairs ($a_1, \ldots a_{13}$) of the image (M) of a sample article (30) and the keypoint-descriptor pairs ($b_1, \ldots, b_{17}$) of the first image (I1) of a plurality of duplicate articles (3);

g) acquiring a relative position and a relative orientation of the identifying figure (Z) with respect to a first keypoint-descriptor pair ($a_{10}$) of the image (M) of a sample article (30) having a match with a second keypoint-descriptor pair ($b_{13}$) of the first (I1) of a plurality of duplicate articles (3);

h) defining, in the first image (I1) of a plurality of duplicate articles (3), an identifying figure of projection ($Z_6$) having a shape and dimension which are comparable or identical to those of the identifying figure (2), which identifying figure of projection ($Z_6$) has a relative position and a relative orientation with resect to the second keypoint-descriptor pair ($b_{13}$) of the first image (I1) of a plurality of duplicate articles (3) which are identical respectively to the relative position and to the relative orientation assumed by the identifying figure (Z) arranged in the image (M) of a sample article (30) with respect to the first keypoint-descriptor pair ($a_{10}$) of the image (M) of a sample article (30);

i) applying the two preceding stages to a plurality of keypoint-descriptor pairs ($a_2, a_1, a_5, a_3, a_4, a_{10}, a_{11}, a_8, a_9$) of the image (M) of a sample article (30) having a match with a keypoint-descriptor pair ($b_{12}, b_7, b_9, b_5, b_4, b_{13}, b_{10}, b_2, b_{11}$) of the first image (I1) of a plurality of duplicate articles (3);

j) collecting together identifying figures of projection ($Z_1, \ldots, Z_9$) having between them a predetermined degree of superposing;

k) defining a representative figure ($F_1, G_1$) for each group of identifying figures of projection ($Z_1, \ldots, Z_9$) which is formed by a minimum predetermined number of identifying figures of projection ($Z_1, \ldots, Z_9$), which representative figure ($F_1, G_1$) has a same shape and dimension as an identifying figure of projection ($Z_1, \ldots, Z_9$), and is selected in order to estimate a position of a corresponding article (3) illustrated in the first image (I1) of a plurality of duplicate articles (3);

wherein each identifying figure of projection ($Z_1, \ldots, Z_9$) associated to a corresponding identifying figure (Z) and a first keypoint-descriptor pair ($a_{10}$) of the image (M) of a sample article (30) having a match with a second keypoint-descriptor pair ($b_{13}$) of the first image (I1) of a plurality of duplicate articles (3), is obtained as a Euclidean transformation of the identifying figure (Z);

wherein the sample article (30), before the image (M) is acquired of the sample article (30), is orientated in three-dimensional space in an orientation which is similar or comparable to the orientation taken on by a number of duplicate articles (3) being part of the plurality of duplicate articles (3) taken via the relative first image (I1) of a plurality of duplicate articles (3);

wherein the first image (I1) of a plurality of duplicate articles (3) is obtained by taking a first image (I1) of a plurality of duplicate articles (3) which are arranged loosely in a storage zone (5) of duplicate articles (3), and in that it comprises picking up an article (3) illustrated in the first image (I1) of a plurality of duplicate articles (3), to which a representative figure (F1, G1) corresponds, and positioning the article (3) at an outlet station (SU).

12. The method of claim 11 further comprising, before the stage of acquiring a first image (I1) of a plurality of duplicate articles (3) arranged loosely in the storage zone (5) of duplicate articles (3), agitating the duplicate articles (3) arranged in the storage zone (5) of duplicate articles (3) in order to arrange them such that the relative upper layer is substantially horizontal.

13. The method of claim 11, wherein at least a characteristic point of projection ($P_{0.6}$) is also a suitable point for picking up the article (3) and in that it comprises picking up the article (3) at the characteristic point of projection ($P_{0.6}$) suitable for picking up the article (3).

14. The method of claim 12, wherein at least a characteristic point of projection ($P_{0.6}$) is also a suitable point for picking up the article (3) and in that it comprises picking up the article (3) at the characteristic point of projection ($P_{0.6}$) suitable for picking up the article (3).

15. The method of claim 11 further comprising the steps of:

identifying the representative figures (F1, G1) which in the first image (I1) of a plurality of duplicate articles (3) intersect one another;

detecting corresponding common areas of intersection (50) of the representative figures (F1, G1) which intersect one another;

identifying the keypoint-descriptor pairs ($b_3, b_9, b_{11}$) of the first image (I1) of a plurality of duplicate articles (3) which fall within the common intersecting areas (50);

identifying to which identifying figures of projection the keypoint-descriptor pairs ($b_3, b_9, b_{11}$) of the first image (I1) of a plurality of duplicate articles (3) are associated;

identifying to which representative figures (F1, G1) which intersect one another the identifying figures of projection are associated in order to establish in what mutual superposing relation the articles (3) illustrated in the first image (I1) of a plurality of duplicate articles (3) are situated, to which the representative mutually-intersecting figures (F1, G1) correspond; and establishing a picking-up order for the articles (3).

16. The method of claim 12, further comprising the steps of:

identifying the representative figures (F1, G1) which in the first image (I1) of a plurality of duplicate articles (3) intersect one another;

detecting corresponding common areas of intersection (50) of the representative figures (F1, G1) which intersect one another;

identifying the keypoint-descriptor pairs ($b_3$, $b_9$, $b_{11}$) of the first image (I1) of a plurality of duplicate articles (3) which fall within the common intersecting areas (50);

identifying to which identifying figures of projection the keypoint-descriptor pairs ($b_3$, $b_9$, $b_{11}$) of the first image (I1) of a plurality of duplicate articles (3) are associated;

identifying to which representative figures (F1, G1) which intersect one another the identifying figures of projection are associated in order to establish in what mutual superposing relation the articles (3) illustrated in the first image (I1) of a plurality of duplicate articles (3) are situated, to which the representative mutually-intersecting figures (F1, G1) correspond; and establishing a picking-up order for the articles (3).

17. The method of claim 13 further comprising the steps of:

identifying the representative figures (F1, G1) which in the first image (I1) of a plurality of duplicate articles (3) intersect one another;

detecting corresponding common areas of intersection (50) of the representative figures (F1, G1) which intersect one another;

identifying the keypoint-descriptor pairs ($b_3$, $b_9$, $b_{11}$) of the first image (I1) of a plurality of duplicate articles (3) which fall within the common intersecting areas (50);

identifying to which identifying figures of projection the keypoint-descriptor pairs ($b_3$, $b_9$, $b_{11}$) of the first image (I1) of a plurality of duplicate articles (3) are associated;

identifying to which representative figures (F1, G1) which intersect one another the identifying figures of projection are associated in order to establish in what mutual superposing relation the articles (3) illustrated in the first image (I1) of a plurality of duplicate articles (3) are situated, to which the representative mutually-intersecting figures (F1, G1) correspond; and establishing a picking-up order for the articles (3).

18. The method of claim 12 further comprising the steps of:

acquiring a second image (I2) of a plurality of duplicate articles (3) which are arranged loosely in the storage zone (5) of articles (3), the second image (I2) being taken from a point of view which is different from the point of view from which the first image (I1) of a plurality of duplicate articles (3) has been taken;

calculating the keypoints of the second image (I2) of the plurality of duplicate articles (3) and the corresponding descriptors in order to obtain a respective plurality of keypoint-descriptor pairs of the second image (I2) of the plurality of duplicate articles (3);

performing the matching of the keypoint-descriptor pairs of the first image (I1) of a plurality of duplicate articles (3) with the keypoint-descriptor pairs of the second image (I2) of a plurality of duplicate articles (3) in order to define correspondence of similarity between keypoint-descriptor pairs of the first image (I1) of a plurality of duplicate articles (3) and the keypoint-descriptor pairs of the second image (I2) of a plurality of duplicate articles (3);

selecting a keypoint-descriptor pair ($u_j$, $u_k$) of the first image (I1) of a plurality of duplicate articles (3) having a match with a keypoint-descriptor pair ($v_s$, $v_n$) in the second image (I2) of a plurality of duplicate articles (3) in order to approximate the position of the at least a characteristic point of projection ($P_0^F$, $P_0^G$) which is also a suitable point for picking up the article (3);

estimating the position in three-dimensional space of the keypoint-descriptor pair ($u_j$, $u_k$) thus selected and associate it to the characteristic point of projection ($P_0^F$, $P_0^G$) which is also a point for picking up the article.

* * * * *